(12) United States Patent
Boutin et al.

(10) Patent No.: US 9,903,180 B2
(45) Date of Patent: Feb. 27, 2018

(54) COMPRESSION ACTIVATED BYPASS VALVE

(71) Applicant: Halliburton Energy Services, Inc., Houston, TX (US)

(72) Inventors: Jacob James Boutin, Lafayette, LA (US); Christopher Dale Russo, Lafayette, LA (US); Daniel Aaron Sanchez, Duncan, OK (US)

( * ) Notice: Subject to any disclaimer, the term of this patent is extended or adjusted under 35 U.S.C. 154(b) by 0 days.

(21) Appl. No.: 14/913,745

(22) PCT Filed: May 20, 2015

(86) PCT No.: PCT/US2015/031755
§ 371 (c)(1),
(2) Date: Feb. 23, 2016

(87) PCT Pub. No.: WO2016/186666
PCT Pub. Date: Nov. 24, 2016

(65) Prior Publication Data
US 2017/0159408 A1 Jun. 8, 2017

(51) Int. Cl.
*E21B 34/12* (2006.01)
*F16K 17/02* (2006.01)
(Continued)

(52) U.S. Cl.
CPC .......... *E21B 34/12* (2013.01); *E21B 23/006* (2013.01); *F16K 11/0712* (2013.01);
(Continued)

(58) Field of Classification Search
CPC .............................. E21B 34/12; E21B 23/006
(Continued)

(56) References Cited

U.S. PATENT DOCUMENTS 2,480,879 A * 9/1949 Rice, Jr. .................... E21B 6/08
123/193.1
3,280,917 A 10/1966 Kisling
(Continued)

FOREIGN PATENT DOCUMENTS

WO 0106086 A1 1/2001

OTHER PUBLICATIONS

International Searching Authority, Patent Cooperation Treaty, International Search Report, International application No. PCT/US2015/031755, which is a PCT parent to the instant application, dated Dec. 10, 2015.
(Continued)

*Primary Examiner* — Giovanna C. Wright
(74) *Attorney, Agent, or Firm* — Howard L. Speight, PLLC

(57) ABSTRACT

A main body housing includes a main body port. An O-ring sleeve is contained in the housing. The O-ring sleeve includes an O-ring sleeve port and O-rings mounted on either side of the O-ring sleeve port. The O-ring sleeve is not rotatable with respect to the main body housing and is translatable with respect to the main body housing between an open O-ring sleeve position and a closed O-ring sleeve position. The O-ring sleeve port aligns with the main body port when the O-ring sleeve is in the open O-ring sleeve position and the O-ring sleeve port is sealed from the main body port by the O-rings when the O-ring sleeve is in the closed O-ring sleeve position.

12 Claims, 14 Drawing Sheets

(51) Int. Cl.
*F16K 11/07* (2006.01)
*F16K 27/04* (2006.01)
*E21B 23/00* (2006.01)
*E21B 34/00* (2006.01)

(52) U.S. Cl.
CPC .......... *F16K 11/0716* (2013.01); *F16K 17/02* (2013.01); *F16K 27/041* (2013.01); *E21B 2034/007* (2013.01)

(58) Field of Classification Search
USPC ......................................................... 166/331
See application file for complete search history.

(56) References Cited

U.S. PATENT DOCUMENTS

| | | | |
|---|---|---|---|
| 5,609,178 A | 3/1997 | Hennig et al. | |
| 5,711,386 A | 1/1998 | Swietlik | |
| 5,890,540 A * | 4/1999 | Pia | E21B 21/10 166/321 |
| 6,095,249 A * | 8/2000 | McGarian | E21B 21/002 166/319 |
| 6,173,795 B1 * | 1/2001 | McGarian | E21B 21/10 166/321 |
| 6,820,697 B1 | 11/2004 | Churchill | |
| 8,403,067 B2 | 3/2013 | Knobloch et al. | |
| 2005/0072572 A1 | 4/2005 | Churchill | |
| 2009/0114289 A1 | 5/2009 | Martin | |
| 2009/0159264 A1 | 6/2009 | Turner et al. | |
| 2011/0083857 A1 | 4/2011 | Knobloch et al. | |
| 2013/0092396 A1 * | 4/2013 | Webber | E21B 34/10 166/375 |
| 2013/0118758 A1 * | 5/2013 | Caminari | F17D 1/16 166/373 |
| 2014/0262211 A1 * | 9/2014 | Xu | E21B 23/006 166/179 |
| 2014/0345949 A1 * | 11/2014 | Cramer | E21B 34/10 175/214 |

OTHER PUBLICATIONS

International Searching Authority, Patent Cooperation Treaty, Written Opinion of the International Searching Authority, International application No. PCT/US2015/031755, which is a PCT parent to the instant application, dated Dec. 10, 2015.

* cited by examiner

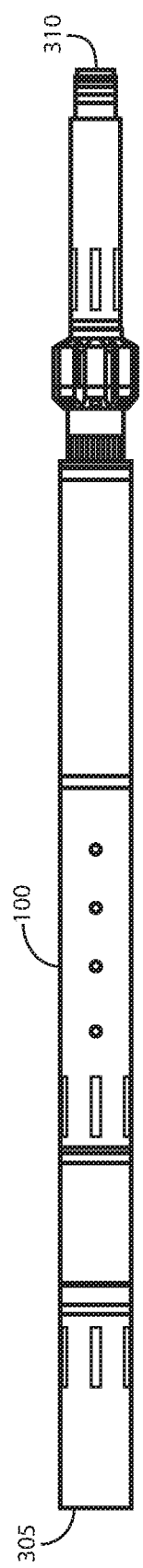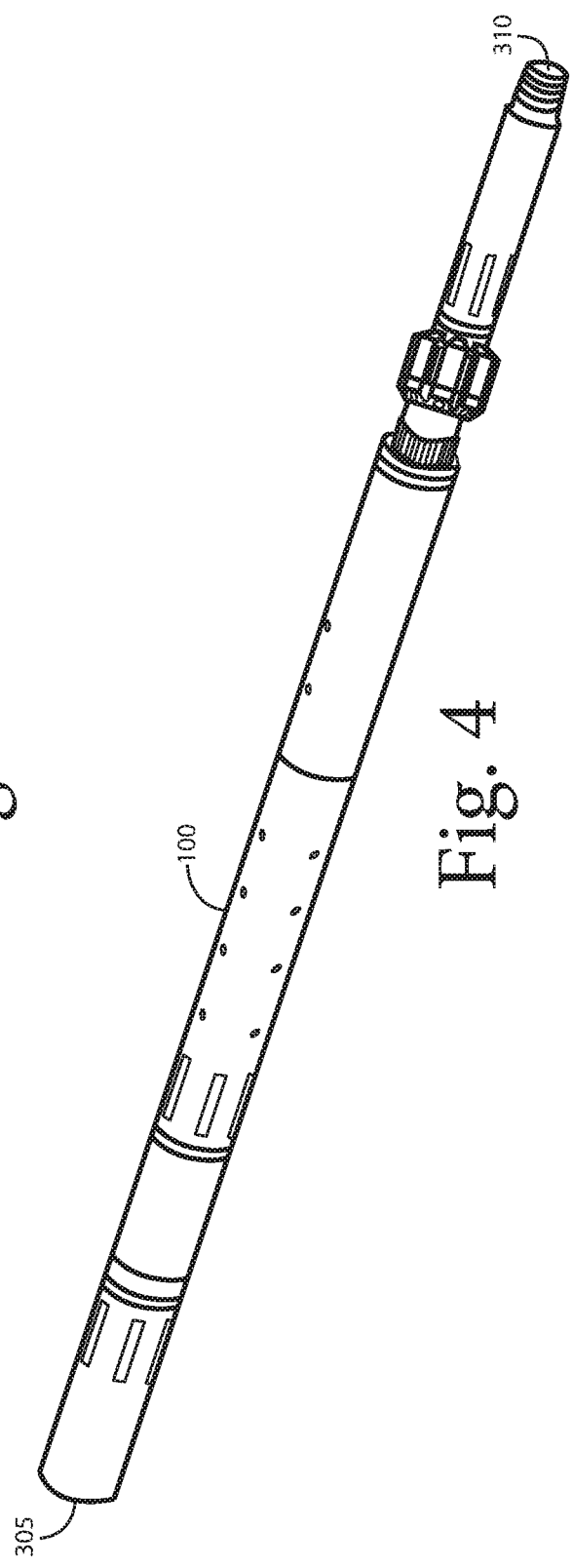

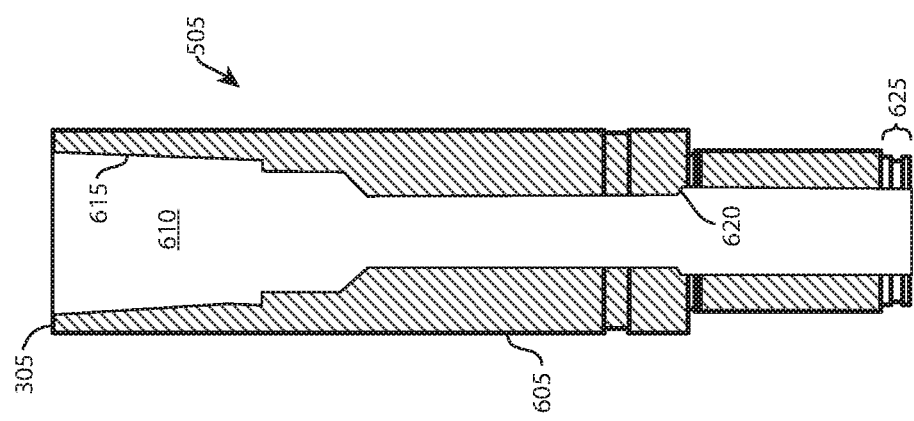
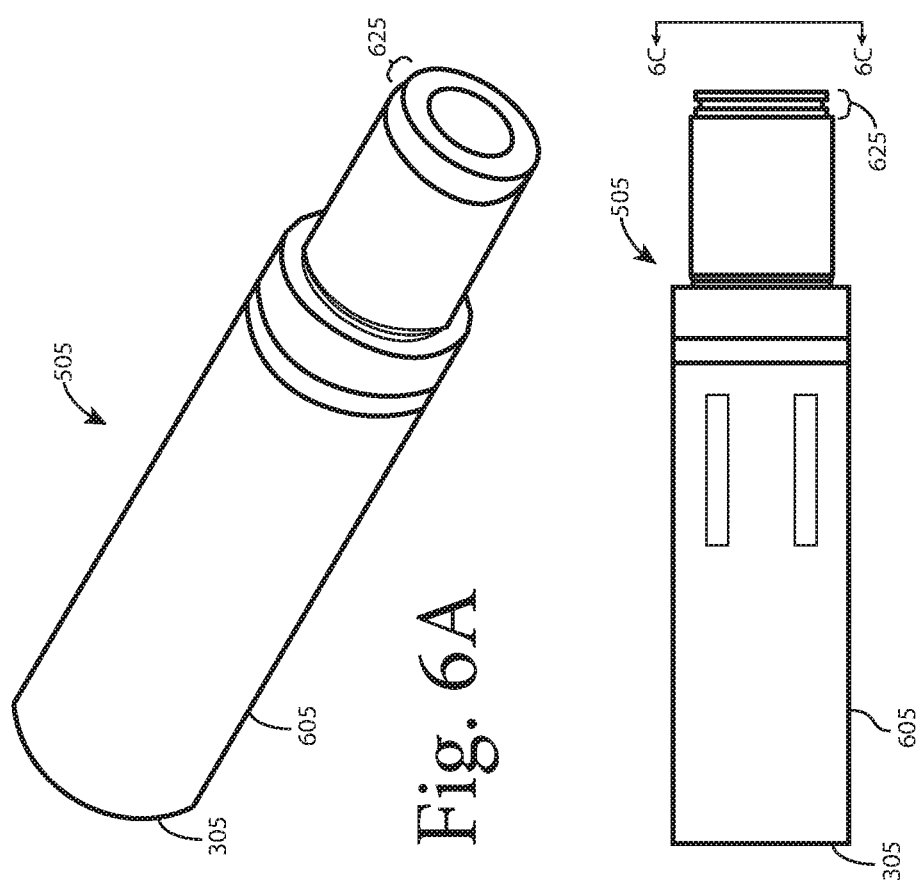

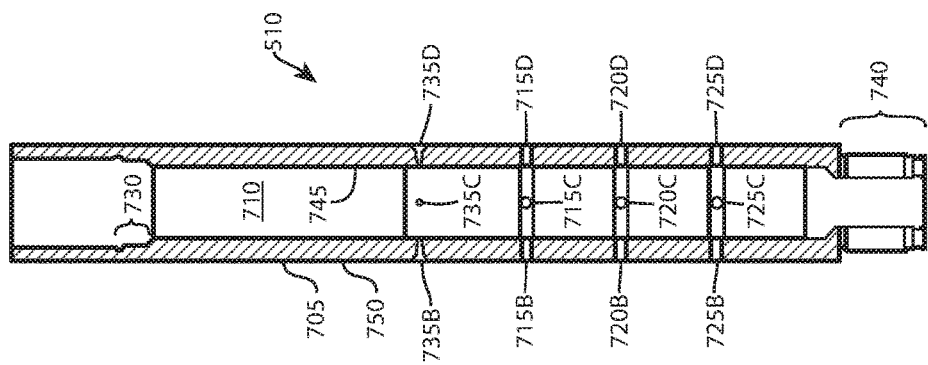
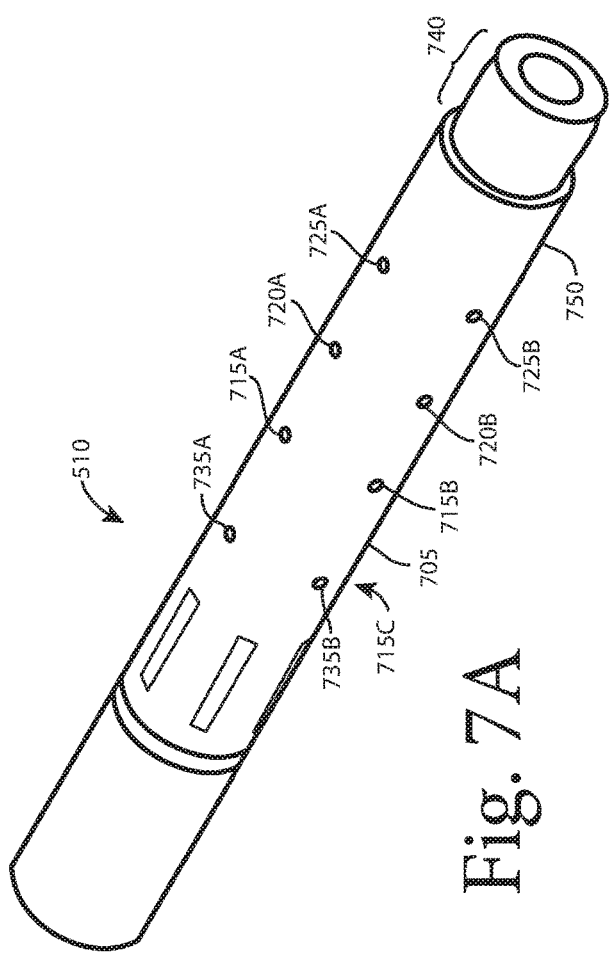
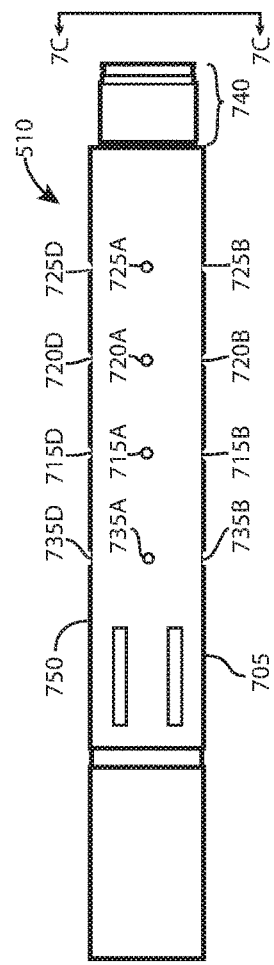
Fig. 7A
Fig. 7B
Fig. 7C

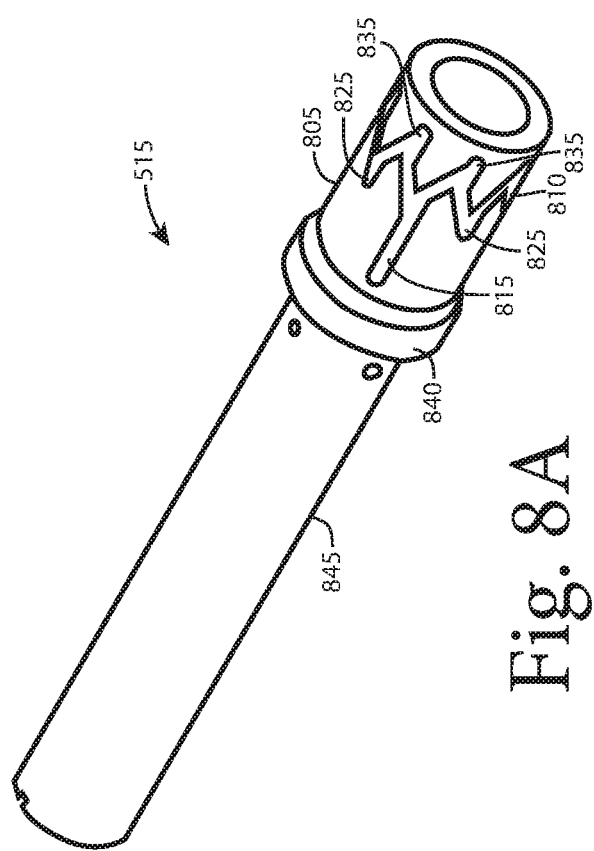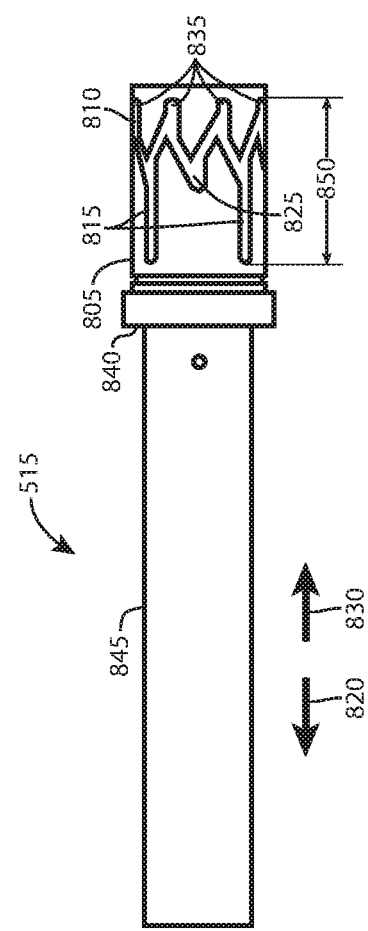

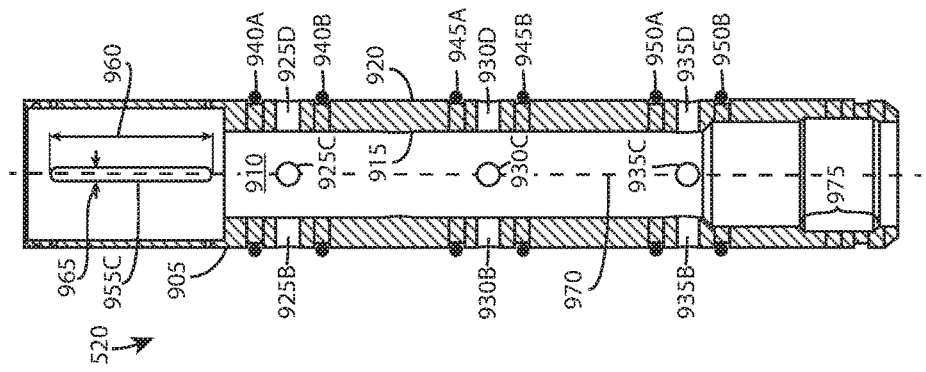
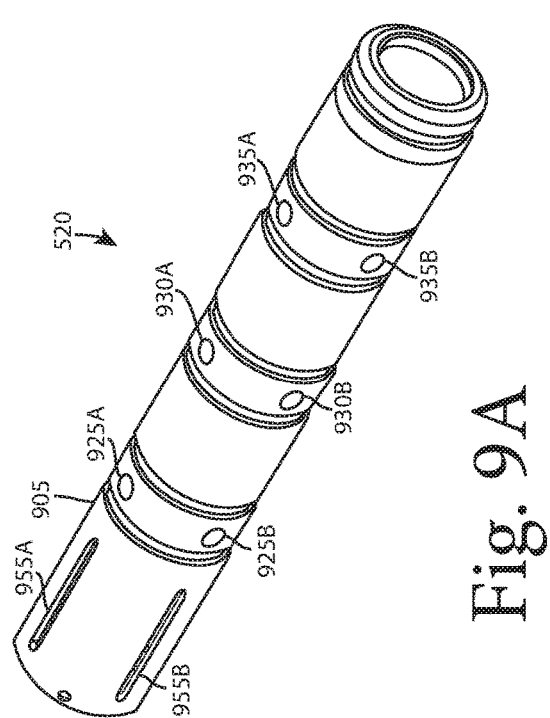
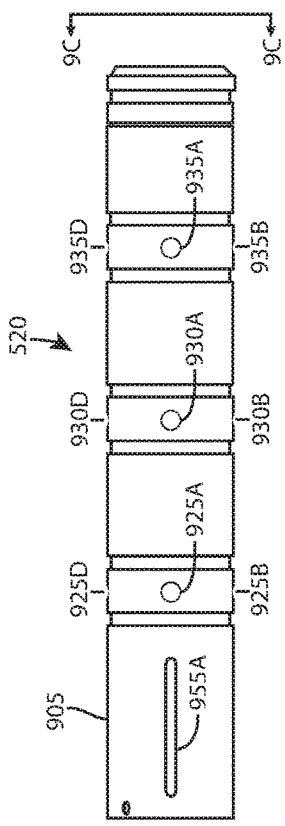

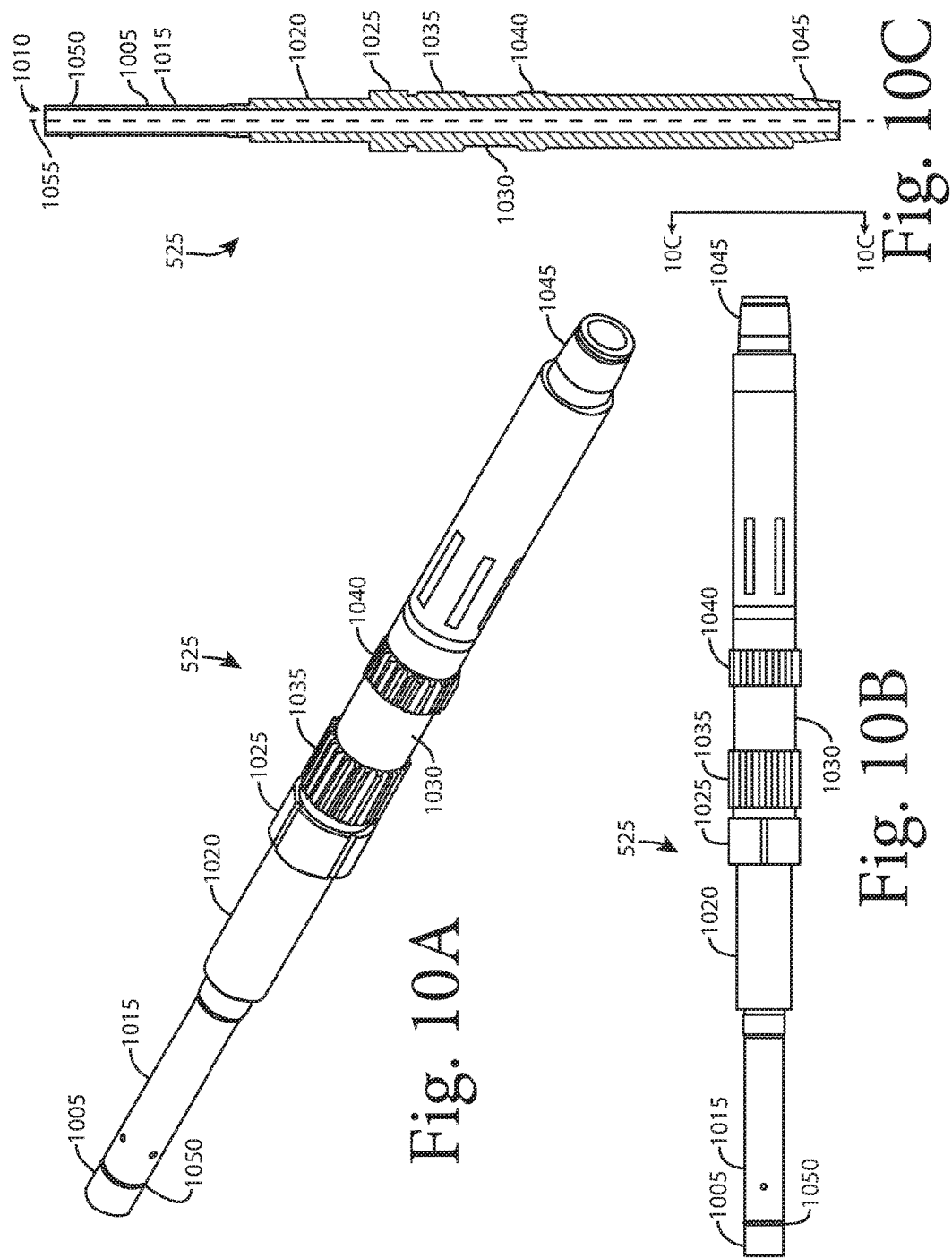

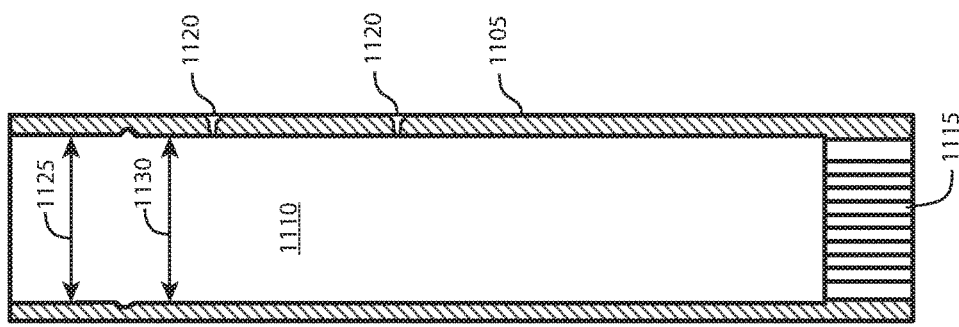
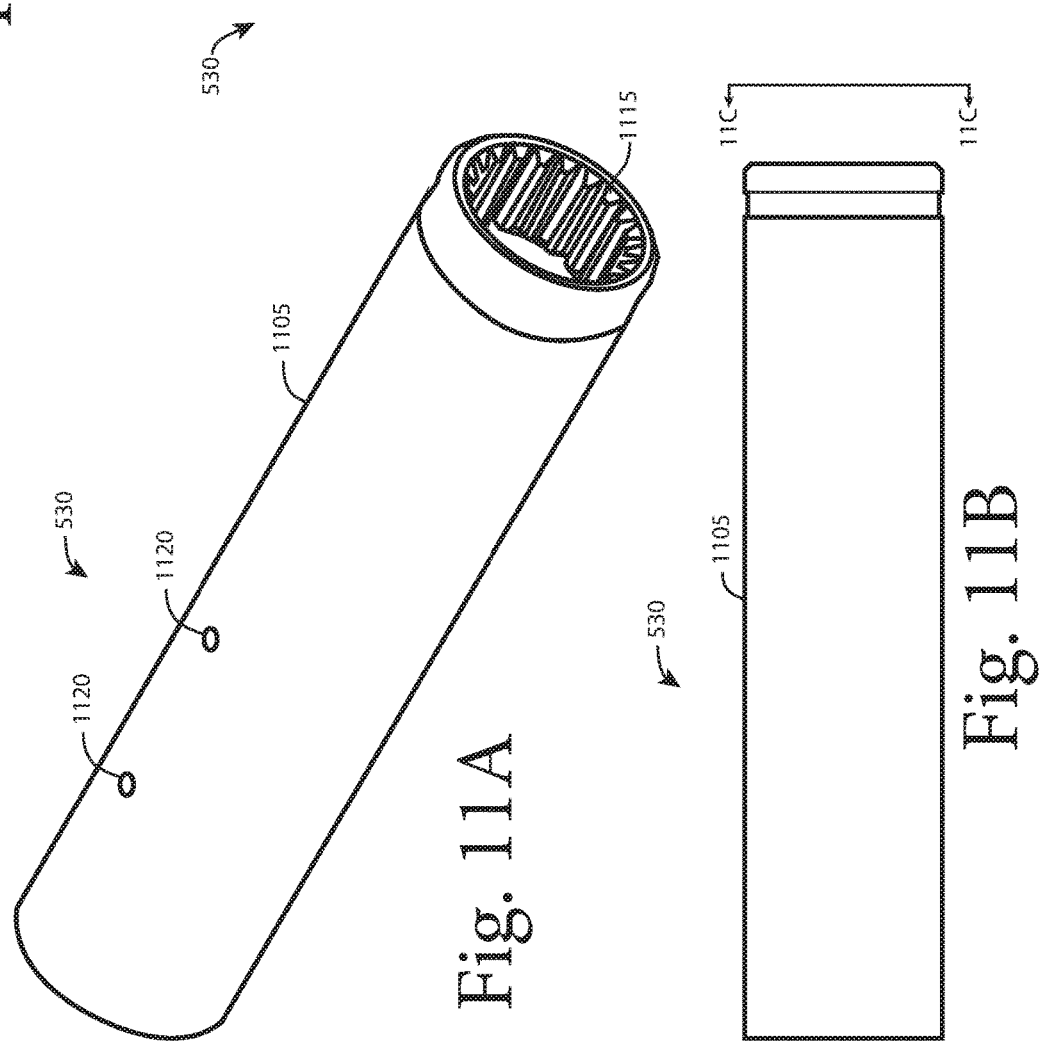

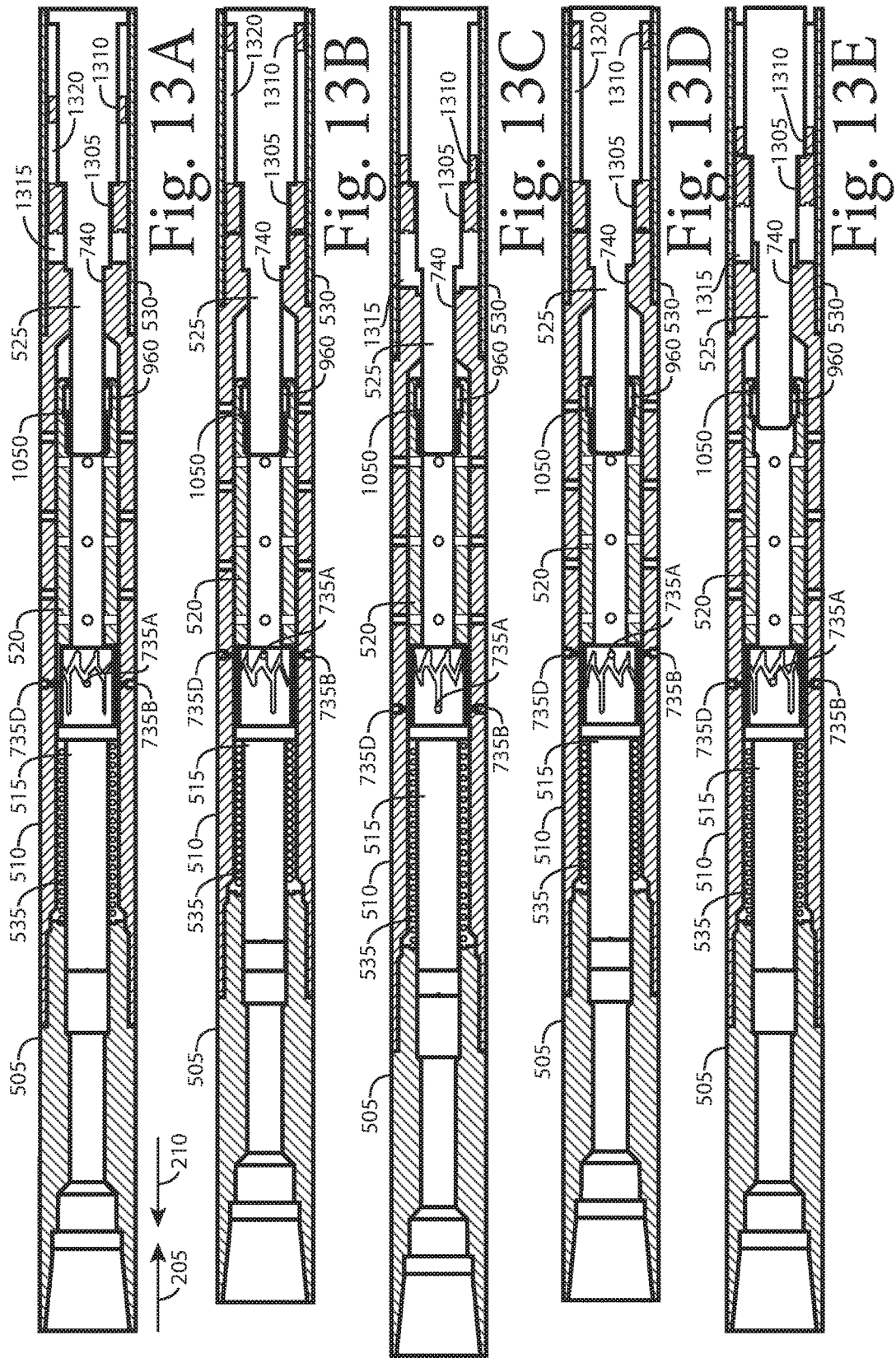

COMPRESSION ACTIVATED BYPASS VALVE

BACKGROUND

Bypass valves are typically used in servicing wells, such as oil and gas wells. Such valves are typically run into wellbores assembled or connected in a tubular string and are used to selectively discharge fluids from the interior of the tubing string into an annular space around the bypass valve. In some applications, this discharge is used to boost or assist the flow of debris in the annular space.

BRIEF DESCRIPTION OF THE DRAWINGS

FIG. 3 is a plan view of a compression activated bypass valve.

FIG. 4 is a perspective view of a compression activated bypass valve.

FIG. 6A is a perspective view of a box end assembly.
FIG. 6B is a plan view of a box end assembly.
FIG. 6C is a cross-sectional view of a box end assembly.
FIG. 7A is a perspective view of a main body.
FIG. 7B is a plan view of a main body.
FIG. 7C is a cross-sectional view of a main body.
FIG. 8A is a perspective view of a spool.
FIG. 8B is a plan view of a spool.
FIG. 9A is a perspective view of an O-ring sleeve.
FIG. 9B is a plan view of an O-ring sleeve.
FIG. 9C is a cross-sectional view of an O-ring sleeve.
FIG. 10A is a perspective view of a pin end mandrel.
FIG. 10B is a plan view of a pin end mandrel.
FIG. 10C is a cross-sectional view of a pin end mandrel.
FIG. 11A is a perspective view of a chamber body.
FIG. 11B is a plan view of a chamber body.
FIG. 11C is a cross-sectional view of a chamber body.
FIGS. 13A-13E are cross-sectional views of a bypass valve transitioning between open and closed states.

DETAILED DESCRIPTION

Figure 1:
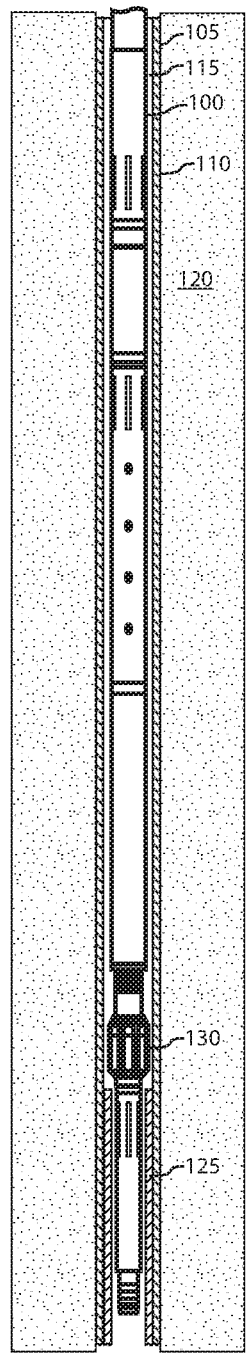
FIGS. 1 and 2 are illustrations showing a compression activated bypass valve in a borehole.

In one or more embodiments, illustrated in FIG. 1, a compression activated bypass valve (or "bypass valve") 100 is positioned in a borehole 105 lined with a first casing 110, forming an annulus 115 around the bypass valve 100 inside the borehole 105. In one or more embodiments, the borehole 105 penetrates a formation 120. In one or more embodiments, the bypass valve 100 is positioned near the top of a second casing 125. In one or more embodiments, the second casing 125 is smaller in diameter than the first casing 110.

Figure 2:
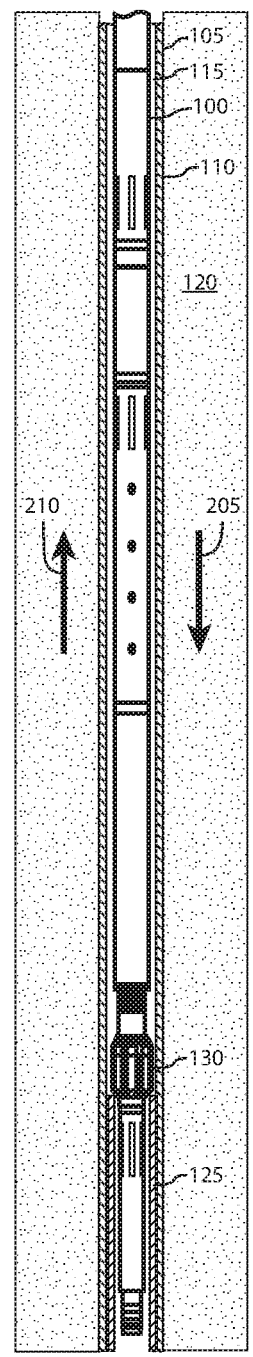

In FIG. 1, the bypass valve 100 is not in contact with the second casing. In FIG. 2, a landing ring 130 of the bypass valve 100 is in contact with the second casing. In one or more embodiments, alternate applications of a force in a "weight down" direction indicated by arrow 205 in FIG. 2 and a force in a "lifted off" direction indicated by arrow 210 in FIG. 2, will open and close the bypass valve 100, as described below in connection with FIGS. 13A-13E, thereby selectively discharging fluids.

In one or more embodiments, illustrated in FIGS. 3 and 4, the bypass valve 100 has a box end 305 and a pin end 310 that allow it to be inserted into a tubular string.

Figure 5:
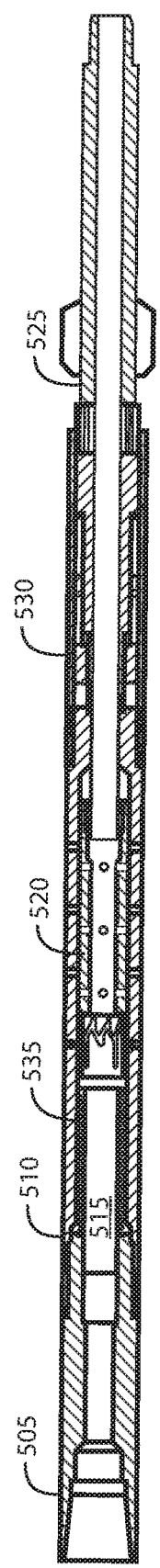
FIG. 5 is a cross-sectional view of a compression activated bypass valve.

In one or more embodiments, illustrated in FIG. 5, the bypass valve 100 includes a box end assembly 505 (described in more detail in connection with FIGS. 6A-6C), a main body 510 (described in more detail in connection with FIGS. 7A-7C), a spool 515 (described in more detail in connection with FIGS. 8A-8B), an O-ring sleeve 520 (described in more detail in connection with FIGS. 9A-9C), a pin end mandrel 525 (described in more detail in connection with FIGS. 10A-10C), and a chamber body 530 (described in more detail in connection with FIGS. 11A-11C), and a spring 535.

In one or more embodiments, illustrated in FIGS. 6A-6C, the box end assembly 505 includes the box end 305 of the bypass valve 100. In one or more embodiments, the box end assembly 505 includes a box end assembly housing 605 with a box end assembly bore 610, through which fluids, such as drilling fluids, can flow. In one or more embodiments, the housing 605 has threads 615 by which the box end assembly 505 and the bypass valve 100 can be coupled to a string of tubular, such as a drill string (not shown). In one or more embodiments, the housing 605 includes a spring shoulder 620 against which the spring 535 is urged when the bypass valve 100 is assembled. In one or more embodiments, the housing 605 includes main body engagement ring 625 that engages with the main body 510 so that the box end assembly 505 and the main body are locked together.

In one or more embodiments, illustrated in FIGS. 7A-7C, the main body 510 includes an elongated main body housing 705. In one or more embodiments, the main body housing 705 has a main body bore 710 running along a long dimension of the main body housing 705. In one or more embodiments, the main body housing 705 is pierced by a set of shallow main body ports 715A-D, a set of mid main body ports 720A-D, and a set of deep main body ports 725A-D. In one or more embodiments, the three sets of main body ports 715A-D, 720A-D, and 725A-D will be aligned and misaligned with O-ring sleeve ports in the O-ring sleeve 520 (discussed below in connection with FIGS. 9A-9C) as the bypass valve 100 is opened and closed.

In one or more embodiments, each of the sets of main body ports 715A-D, 720A-D, and 725A-D includes four ports. That is, in one or more embodiments, the set of shallow main body ports 715A-D includes shallow main body port 715A, shallow main body port 715B, shallow main body port 715C, and shallow main body port 715D. In one or more embodiments, the set of mid main body ports 720A-D includes mid main body port 720A, mid main body port 720B, mid main body port 720C, and mid main body port 720D. In one or more embodiments, the set of deep main body ports 725A-D includes deep main body port 725A, deep main body port 725B, deep main body port 725C, and deep main body port 725D.

In one or more embodiments, the number of sets of main body ports is different than that shown in FIGS. 7A-7C. In one or more embodiments, the number of sets of main body ports is 1, 2, 4, or some other number that is not 3.

In one or more embodiments, the sets of main body ports 715A-D, 720A-D, and 725A-D are aligned. That is, in one or more embodiments, main body ports 715A, 720A, and 725A are arranged in a line substantially (i.e., within 10 degrees) parallel to an axis (not shown) that runs through the center and along the long dimension of the main body housing 705. In one or more embodiments, the sets of main body ports 715A-D, 720A-D, and 725A-D are not aligned in this way. For example, in one or more embodiments (not shown), main body ports 715A, 720A, and 725A are arranged along a spiral around the main body.

In one or more embodiments, the set of shallow main body ports 715A-D (this discussion also applies to mid main body ports 720A-D and deep main body ports 725A-D) are offset at substantially (i.e., within 10 degrees) 90 degree intervals. That is, in one or more embodiments, shallow main body port 715A is substantially 90 degrees offset from shallow main body port 715B, shallow main body port 715B is substantially 90 degrees offset from shallow main body port 715C, shallow main body port 715C is substantially 90 degrees offset from shallow main body port 715D, and shallow main body port 715D is substantially 90 degrees offset from shallow main body port 715A. In one or more embodiments, the set of shallow main body ports 715A-D are not arranged evenly around the circumference of the main body 520 but are instead concentrated, uniformly or without uniformity, in one sector of the circumference of the O-ring sleeve 510, where the sector is 90 degrees, 180 degrees, or 270 degrees in extent.

In one or more embodiments, fewer than the set of shallow main body ports 715A-D (this discussion also applies to mid main body ports 720A-D and deep main body ports 725A-D) has fewer than four ports. That is, in one or more embodiments, only one, two, or three of the four shallow main body ports 715A-D is provided.

In one or more embodiments, the main body 510 includes a box end engagement feature 730 that makes a secure connection with the main body engagement ring 625 of the box end assembly 505.

In one or more embodiments, the box end assembly 505 makes up to the main body 510 and compresses the spring 535, as shown in FIG. 5, which interacts with the spool 515, as discussed in more detail below in connection with FIGS. 13A-13E.

In one or more embodiments, the main body 510 is pierced by indexing pins 735A, 735B, 735C, and 735D. In one or more embodiments, the indexing pins 735A-D secure the O-ring sleeve 520 (described below in connection with FIGS. 9A-9C) to the main body 510. In one or more embodiments, the indexing pins 735A-D index the spool 515 (described below in connection with FIGS. 8A-8B).

In one or more embodiments, fewer than four indexing pins 735A-D are provided. In one or more embodiments, the indexing pins 735A-D are spaced evenly around the circumference of the main body housing 705, as shown in FIGS. 7A-7C. In one or more embodiments, the indexing pins are not evenly spaced. In one or more embodiments, the indexing pins 735A-D are not spaced evenly around the circumference of the main body 520 but are instead concentrated, uniformly or without uniformity, in one sector, where the sector is 90 degrees, 180 degrees, or 270 degrees in extent.

In one or more embodiments, the main body 505 includes a piston section 740 that acts as a piston as discussed below in connection with FIGS. 13A-13E.

In one or more embodiments, the main body housing 705 includes a main body housing inside surface 745 and a main body housing outside surface 750 and the sets of main body ports 715A-D, 720A-D, and 725A-D are from the main body inside surface 745 to the main body outside surface 750.

In one or more embodiments, illustrated in FIGS. 8A and 8B, the spool 515 includes an indexing barrel 805. In one or more embodiments, the indexing barrel 805 includes an indexing slot 810. In one or more embodiments, the indexing slot 810 includes a plurality of open notches 815 extending in a notch direction, indicated by arrow 820. In one or more embodiments, the indexing slot 810 includes a plurality of closed notches 825 interleaved with the plurality of open notches 815. In one or more embodiments, the closed notches 825 also extend in the notch direction, indicated by arrow 820. In one or more embodiments, the indexing slot 810 includes transition-notch direction (indicated by arrow 830) extending transition notches 835 between the open notches 815 and the closed notches 825. In one or more embodiments, the transition-notch direction 830 is substantially (i.e., within 10 degrees) opposite the notch direction 820. In one or more embodiments, the open notches 815 are longer than the closed notches 825. In one or more embodiments, "longer" means at least 1.5 times the length. In one or more embodiments, "longer" means at least 2.0 times the length. In one or more embodiments, "longer" means at least 2.5 times the length.

In one or more embodiments, the spool 515 includes a spring flange 840 coupled to the indexing barrel 805. In one or more embodiments, the spool 515 includes a spring barrel 845 coupled to the spring flange 840. In one or more embodiments, the spring 535 has a shape of a coil. In one or more embodiments, the spring 535 encloses the spring barrel 845. In one or more embodiments, the spring 535 is engaged with the spring flange 840.

In one or more embodiments, the indexing pins 735A-D are inserted into the indexing slot 810. In one or more embodiments, the spool 515 is rotatable and translatable with respect to the main body 705 and the box end assembly 505. In one or more embodiments, the spool 515 is rotatable among a plurality of open spool positions, in which the indexing pins 735A-D are slotted into the open notches 815 of the spool 515, interleaved with a plurality of closed spool positions, in which the indexing pins 735A-D are slotted into the closed notches 825 of the spool 515.

In one or more embodiments, illustrated in FIGS. 9A-9C, the O-ring sleeve 520 includes an O-ring sleeve housing 905 with an O-ring sleeve bore 910. In one or more embodiments, the O-ring sleeve 520 includes an O-ring sleeve inside surface 915 and an O-ring sleeve outside surface 920.

In one or more embodiments, the O-ring sleeve housing 905 is pierced by a set of shallow O-ring sleeve ports 925A-D, a set of mid O-ring sleeve ports 930A-D, and a set of deep O-ring sleeve ports 935A-D. In one or more embodiments, the three sets of O-ring sleeve ports 925A-D, 930A-D, and 935A-D will be aligned and misaligned with the main body ports 715A-D, 720A-D, and 725A-D in the main body 510 (discussed above in connection with FIGS. 7A-7C) as the bypass valve 100 is opened and closed.

In one or more embodiments, each of the sets of O-ring sleeve ports 925A-D, 930A-D, and 935A-D includes four ports. That is, in one or more embodiments, the set of shallow O-ring sleeve ports 925A-D includes shallow O-ring sleeve port 925A, shallow O-ring sleeve port 925B, shallow O-ring sleeve port 925C, and shallow O-ring sleeve ports 925D. In one or more embodiments, the set of mid O-ring sleeve ports 930A-D includes mid O-ring sleeve port 930A, mid O-ring sleeve port 930B, mid O-ring sleeve port 930C, and mid O-ring sleeve port 930D. In one or more embodiments, the set of deep O-ring sleeve ports 935A-D includes deep O-ring sleeve port 935A, deep O-ring sleeve port 935B, deep O-ring sleeve port 935C, and deep O-ring sleeve port 935D.

In one or more embodiments, the number of sets of O-ring sleeve ports is different than that shown in FIGS. 9A-9C. In one or more embodiments, the number of sets of O-ring sleeve ports is 1, 2, 4, or some other number that is not 3.

In one or more embodiments, the sets of O-ring sleeve ports 925A-D, 930A-D, and 935A-D are aligned. That is, in one or more embodiments, O-ring sleeve ports 925A, 930A, and 935A are arranged in a line substantially (i.e., within 10 degrees) parallel to an axis (not shown) that runs through the center and along the long dimension of the O-ring sleeve housing 905. In one or more embodiments, the sets of O-ring sleeve ports 925A-D, 930A-D, and 935A-D are not aligned in this way. For example, in one or more embodiments (not shown), O-ring sleeve ports 925A, 930A, and 935A are arranged along a spiral around the O-ring sleeve housing 905.

In one or more embodiments, the set of shallow O-ring sleeve ports 925A-D (this discussion also applies to mid O-ring sleeve ports 930A-D and deep O-ring sleeve ports 935A-D) are offset at substantially (i.e., within 10 degrees) 90 degree intervals. That is, in one or more embodiments, shallow O-ring sleeve port 925A is substantially 90 degrees offset from shallow O-ring sleeve port 925B, shallow O-ring sleeve port 925B is substantially 90 degrees offset from shallow O-ring sleeve port 925C, shallow O-ring sleeve port 925C is substantially 90 degrees offset from shallow O-ring sleeve port 925D, and shallow O-ring sleeve ports 925D is substantially 90 degrees offset from shallow O-ring sleeve port 925A. In one or more embodiments, the set of shallow O-ring sleeve ports 925A-D are not arranged evenly around the circumference of the main body 520 but are instead concentrated, uniformly or randomly, in one sector, where the sector is 90 degrees, 180 degrees, or 270 degrees in extent.

In one or more embodiments, the set of shallow O-ring sleeve ports 925A-D (this discussion applies to mid O-ring sleeve ports 930A-D and deep O-ring sleeve ports 935A-D) has fewer than four ports. That is, in one or more embodiments, only one, two, or three of the four shallow O-ring sleeve ports 925A-D is provided. In one or more embodiments, each of the shallow O-ring sleeve ports 925A-D, the mid O-ring sleeve ports 930A-D, and the deep O-ring sleeve ports 935A-D provide a path from the O-ring sleeve bore 910 and the O-ring sleeve inside surface 915 to the O-ring sleeve outside surface 920. In one or more embodiments, O-ring 940A and O-ring 940B are mounted on the O-ring sleeve outside surface 920 on either side of the shallow O-ring sleeve ports 925A-D. In one or more embodiments, O-ring 945A and O-ring 945B are mounted on the O-ring sleeve outside surface 920 on either side of the mid O-ring sleeve ports 930A-D. In one or more embodiments, O-ring 950A and O-ring 950B are mounted on the O-ring sleeve outside surface 920 on either side of the deep O-ring sleeve ports 935A-D. Note that for ease of presentation, the O-rings 940A, 940B, 945A, 945B, 950A, and 950B are shown only in FIG. 9C.

In one or more embodiments, the O-ring sleeve 520 includes O-ring sleeve indexing pin slots 955A-D by which the O-ring sleeve 520 engages with the main body 515 and the spool 515. In one or more embodiments, the indexing pins 735 pass through the main body housing 705, through the spool indexing slot 810, and into the O-ring sleeve indexing pin slots 955A-D.

In one or more embodiments, the interaction between the indexing pins 735A-D and the O-ring sleeve indexing pin slots 955A-D prevents the O-ring sleeve 520 from rotating with respect to the main body 515. In one or more embodiments, the interaction between the indexing pins 735A-D and the O-ring sleeve indexing pin slots 955A-D allows the O-ring sleeve 530 to translate with respect to the main body 515 between open O-ring sleeve positions, when the spool is in one of its open spool positions, and a closed O-ring sleeve position, when the spool is in one of its closed spool position.

In one or more embodiments, the O-ring sleeve indexing pin slots 955A-D are oblong. In one or more embodiments, the O-ring sleeve indexing pin slots 955A-D have a height 960 and a width 965. In one or more embodiments, the height 960 is greater than the width. In one or more embodiments, in this context "greater than" means at least 2 times. In one or more embodiments, in this context "greater than" means at least 4 times. In one or more embodiments, in this context "greater than" means at least 8 times.

In one or more embodiments, the height 960 of the O-ring sleeve indexing pin slots 955A-D is larger than a distance 850 (see FIG. 8B) from the end of one of the open notches 815 to end of transition notches 835, in which case the distance 850 determines the distance the O-ring sleeve 520 translates with respect to the main body 510, as described below in connection with FIGS. 13A-13E.

In one or more embodiments, the width of the O-ring sleeve indexing pin slots 955A-D relative to the width of the indexing pins 735A-D determines the amount of rotation the O-ring sleeve 520 can have with respect to the main body 510. In one or more embodiments, the width 965 of the O-ring sleeve indexing pin slots 955A-D is larger than the width of the indexing pins 735A-D by an amount that is small enough that the O-ring sleeve 520 is considered to be not rotatable with respect to the main body housing 705. In one or more embodiments, in this context "not rotatable" means less than 5 degrees of rotation are permitted. In one or more embodiments, in this context "not rotatable" means less than 10 degrees of rotation are permitted. In one or more embodiments, in this context "not rotatable" means less than 15 degrees of rotation are permitted.

In one or more embodiments, the width 965 of the O-ring sleeve indexing pin slots 955A-D is substantially equal to the width of the indexing pins 735A-D. In one or more embodiments, in this context "substantially equal" is defined to mean the width 965 of the O-ring sleeve indexing pin slots 955A-D is larger by 1 millimeter (mm) than the width of the indexing pins 735A-D. In one or more embodiments, in this context "substantially equal" is defined to mean the width 965 of the O-ring sleeve indexing pin slots 955A-D is larger by 5 mm than the width of the indexing pins 735A-D. In one or more embodiments, in this context "substantially equal" is defined to mean the width 965 of the O-ring sleeve indexing pin slots 955A-D is larger by 10 mm than the width of the indexing pins 735A-D.

In one or more embodiments, a plane, represented in FIG. 9C by dashed line 970, through the center of the O-ring sleeve indexing pin slots 955C also passes through (or, in one embodiment, within 5 mm of; in one embodiment, within 10 mm of; and in one embodiment, within 20 mm of) the center of O-ring sleeve indexing pin slots 955A, the center of shallow O-ring sleeve port 925C, the center of shallow O-ring sleeve port 925A, the center of mid O-ring sleeve port 930C, the center of mid O-ring sleeve port 930A, the center of deep O-ring sleeve port 935C, and the center of deep O-ring sleeve port 925A.

In one or more embodiments, the O-ring sleeve 520 includes an elongated ball bearing groove 975.

In one or more embodiments, illustrated in FIGS. 10A-10C, the pin end mandrel 525 includes a pin end mandrel housing 1005 which has a pin end mandrel bore 1010 running through its long dimension. In one or more embodiments, the pin end mandrel 525 includes an upper chamber barrel 1015, a lower chamber barrel 1020, and a lower chamber stop 1025. In one or more embodiments, the pin end mandrel 525 includes a pin end coupling tube 1030 that provides a mechanical connection to lower elements of the system. In one or more embodiments, the pin end mandrel 525 includes a splined chamber coupling 1035 that couples to the chamber body 530. In one or more embodiments, the pin end mandrel 525 includes a splined landing coupling 1040 which couples to the landing ring 130 (shown in FIGS. 1 and 2). In one or more embodiments, the pin end mandrel 525 includes a threaded pin end 1045 by which the bypass valve 100 couples to other elements in a drill string (not shown). In one or more embodiments, the pin end mandrel 525 includes a ball bearing ring 1050 that fits within the ball bearing groove 975 in the O-ring sleeve 520.

In one or more embodiments, illustrated in FIGS. 11A-11C, the chamber body 530 includes a chamber body housing 1105 with a chamber body bore 1110. In one or more embodiments, the chamber body 530 includes a chamber body splined fitting 1115 that mates with the splined chamber coupling 1035 of the pin end mandrel 525. In one or more embodiments, screws 1120 provide ports through which a chamber within the chamber body 530 can be filled with fluid. In one or more embodiments, the chamber body bore 1110 narrows from a cylinder inside diameter 1125 wide enough for the piston section 740 of the main body 510 to a stopping inside diameter 1130 that is narrower than the piston section 740 of the main body 510.

Figure 12A:
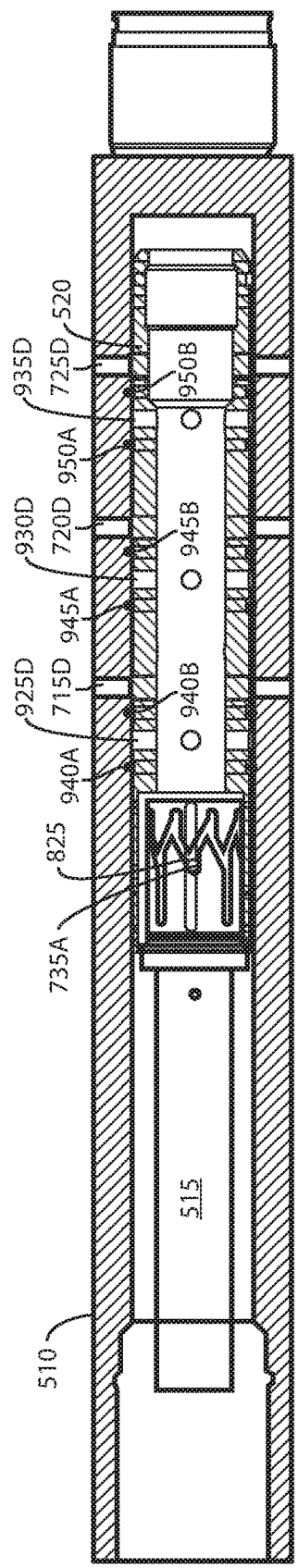
FIG. 12A is a cross-sectional view of a main body, spool, and O-ring sleeve in a closed position.
Figure 12B:
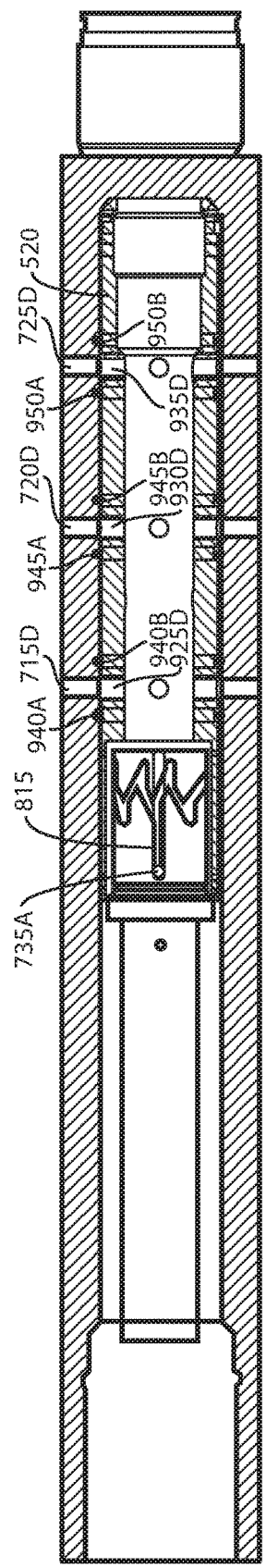
FIG. 12B is a cross-sectional view of a main body, spool, and O-ring sleeve in an open position.

In one or more embodiments, as illustrated in FIG. 12A (which overlays the main body illustrated in FIGS. 7A-7C, the spool 515 illustrated in FIGS. 8A-8B, and the O-ring sleeve 520 illustrated in FIGS. 9A-9C, with labels applied to only those elements pertinent to this discussion), the O-ring sleeve ports 925A-D, 930A-D, 935A-D are sealed from main body ports 715A-D, 720A-D, 725A-D by respective O-rings 940A-B, 945A-B, 950A-B, when the O-ring sleeve 520 is in the closed O-ring sleeve position (i.e., when the indexing pins 735A-D are seated in the closed notches 825 of the spool 515). In one or more embodiments, illustrated in FIG. 12B (which overlays the main body illustrated in FIGS. 7A-7C, the spool 515 illustrated in FIGS. 8A-8B, and the O-ring sleeve 520 illustrated in FIGS. 9A-9C, with labels applied to only those elements pertinent to this discussion), the O-ring sleeve ports 925A-D, 930A-D, 935A-D align with respective main body ports 715A-D, 720A-D, 725A-D when the O-ring sleeve 520 is in the open O-ring sleeve position (i.e., when the indexing pins 735A-D are seated in the open notches 815 of the spool 515).

Opening the Bypass Valve

In one or more embodiments, illustrated in FIGS. 13A-13E, picking up and restoring tension to the bypass valve 100 causes the box end assembly 505, the main body 510, the indexing pins 735A-D, and the chamber body 530 to translate relative to the O-ring sleeve 520 and to translate and rotate with respect to the spool 515, causing the bypass valve 100 to open and close.

In one or more embodiments, illustrated in FIG. 13A, the bypass valve 100 is in the closed position with the O-ring sleeve ports 925A-D, 930A-D, 935A-D sealed from main body ports 715A-D, 720A-D, 725A-D, as discussed in connection with FIG. 12A, and the ball bearing ring 1050 at the top (i.e., at the lifted off direction-most 210 end) of the ball bearing groove 975.

In one or more embodiments, illustrated in FIG. 13B, force is applied to the bypass valve 100 in the weight down direction 205, causing the box end assembly 505, the main body 510, the indexing pins 735A-D, and the chamber body 530 to move in the weight down direction 205 relative to the spool 515 and the O-ring sleeve 520. In one or more embodiments, this motion compresses the spring 535. In one or more embodiments, the indexing pins 735A-D move within the indexing slot 810 of the spool 515 until the indexing pins 735A-D are seated in respective transition slots 835. In one or more embodiments, this motion causes the spool 515 to rotate to the position shown in FIG. 13B. In one or more embodiments, in this position the O-ring sleeve ports 925A-D, 930A-D, 935A-D are sealed from main body ports 715A-D, 720A-D, 725A-D. In one or more embodiments, the ball bearing ring 1050 remains at the top of the ball bearing groove 975, being held there by the spring 535.

In one or more embodiments, as illustrated in FIG. 13C, force in the lifted off direction 210 is applied to the bypass valve 100, causing the box end assembly 505, the main body 510, the indexing pins 735A-D, and the chamber body 530 to move in the lifted off direction 210 relative to the spool 515 and the O-ring sleeve 520. In one or more embodiments, this motion causes the spring 525 to decompress. In one or more embodiments, the indexing pins 735A-D move within the indexing slot 810 of the spool 515, until the indexing pins 735A-D are seated in respective open notches 815. In one or more embodiments, this motion causes the spool 515 to rotate to the position shown in FIG. 13C. In one or more embodiments, in this position, illustrated in more detail in FIG. 12B, discussed above, the O-ring sleeve ports 925A-D, 930A-D, 935A-D are in communication with main body ports 715A-D, 720A-D, 725A-D, allowing fluids to flow from the bore of the bypass valve 100 into the annulus 115. In one or more embodiments, the ball bearing ring 1050 remains at the top of the ball bearing groove 975.

Closing the Bypass Valve

In one or more embodiments, illustrated in FIG. 13D, force is applied to the bypass valve 100 in the weight down direction 205, causing the box end assembly 505, the main body 510, the indexing pins 735A-D, and the chamber body 530 to move in the weight down direction 205 relative to the spool 515 and the O-ring sleeve 520. In one or more embodiments, this motion causes the spring 535 to compress. In one or more embodiments, the indexing pins 735A-D move within the indexing slot 810 of the spool 515 until the indexing pins 735A-D are seated in respective transition slots 835. In one or more embodiments, this motion causes the spool 515 to rotate to the position shown in FIG. 13D. In one or more embodiments, in this position the O-ring sleeve ports 925A-D, 930A-D, 935A-D are sealed from main body ports 715A-D, 720A-D, 725A-D. In one or more embodiments, the ball bearing ring 1050 remains at the top of the ball bearing groove 975.

In one or more embodiments, as illustrated in FIG. 13E, force in the lifted off direction 210 is applied to the bypass valve 100, causing the box end assembly 505, the main body 510, the indexing pins 735A-D, and the chamber body 530 to move in the lifted off direction 210 relative to the spool 515 and the O-ring sleeve 520. In one or more embodiments, this motion causes the spring 535 to decompress. In one or more embodiments, the indexing pins 735A-D move within the indexing slot 810 of the spool 515, until the indexing pins 735A-D are seated in respective closed notches 825. In one or more embodiments, this motion causes the spool 515 to rotate to the position shown in FIG. 13E. In one or more embodiments, in this position, illustrated in more detail in FIG. 12A, discussed above, the O-ring sleeve ports 925A-D, 930A-D, 935A-D are sealed from main body ports 715A-D, 720A-D, 725A-D. In one or more embodiments, the ball bearing ring 1050 moves to the bottom of the ball bearing groove 975 (i.e., at the weight down direction-most 205 end of the ball bearing groove 975).

In one or more embodiments, repetition of the tension and release actions described above returns the bypass valve 100 to the condition shown in FIG. 13A.

Setting the Compressive Force Required to Activate the Bypass Valve

Figure 14A:
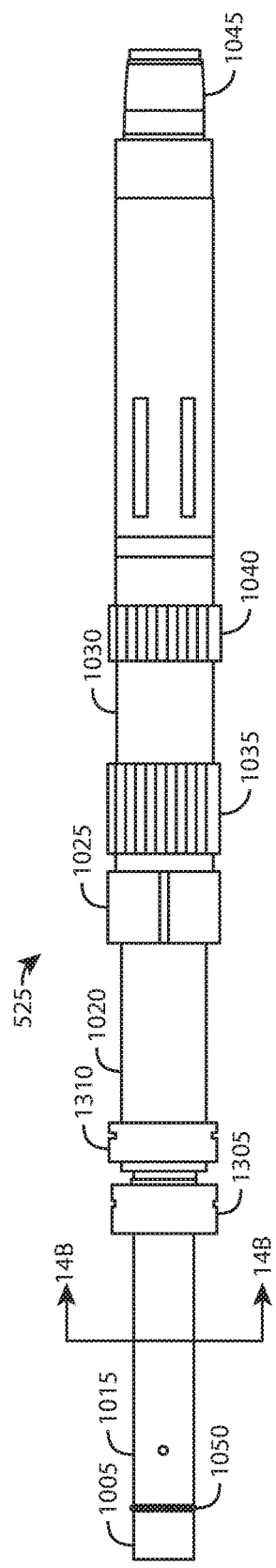
FIG. 14A is a plan view of a pin end mandrel, a valve plate, and a balance piston.
Figure 14B:
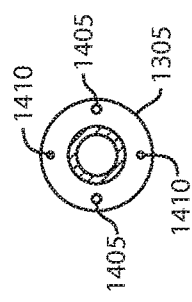
FIG. 14B is a cross-sectional view of a pin end mandrel and a plan view of a valve plate.
Figure 15C:
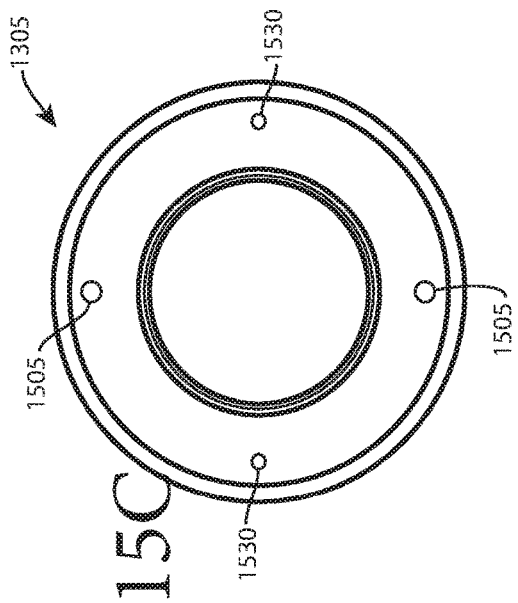
FIGS. 15B, 15C, and 15D are plan views of a valve plate.
Figure 15D:
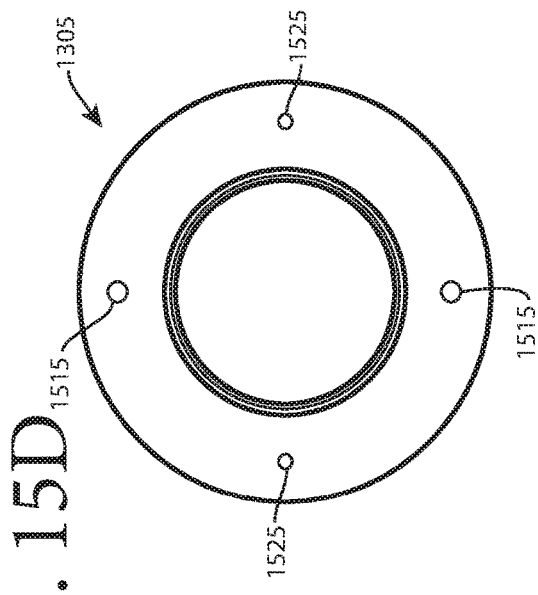
Figure 15A:
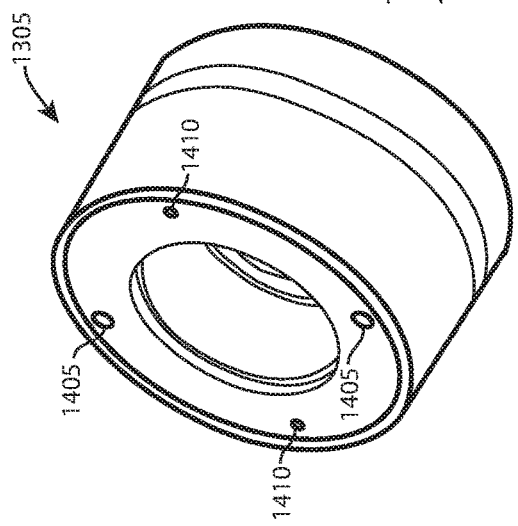
FIG. 15A is a perspective view of a valve plate.
Figure 15B:
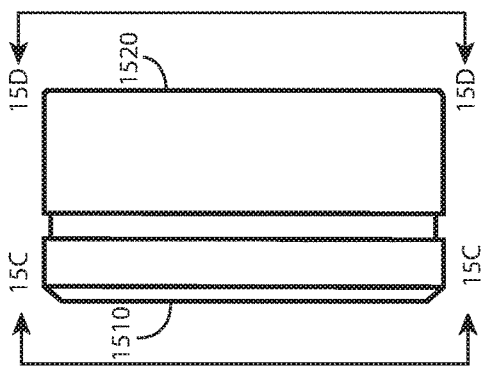
Figure 16C:
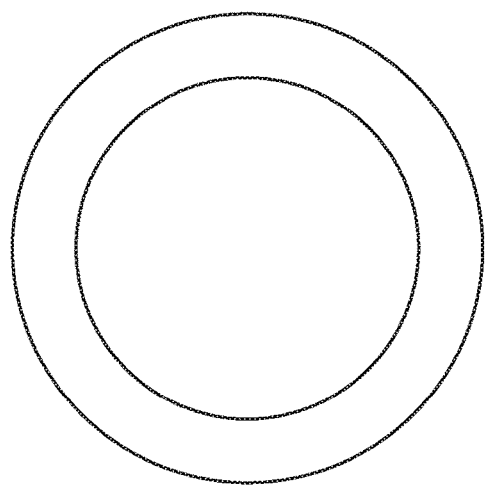
FIGS. 16B and 16C are plan views of a balance piston.
Figure 16B:
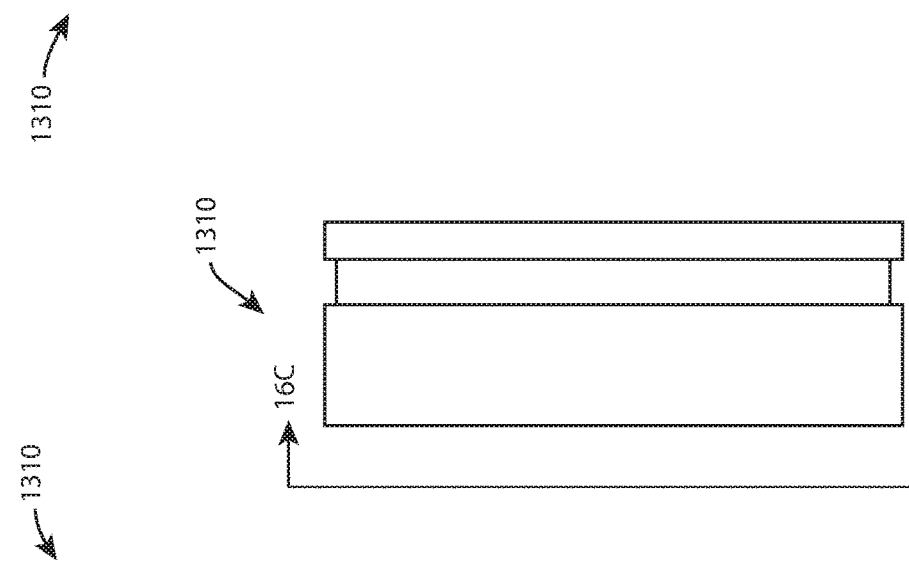
Figure 16A:
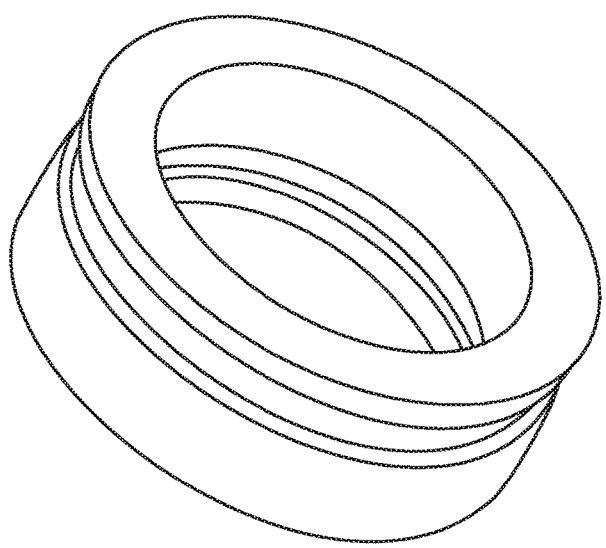
FIG. 16A is a perspective view of a balance piston.

In one or more embodiments, illustrated in FIGS. 13A-E and in FIGS. 14A-B (note that, for simplicity of presentation, the chamber body 530 is not shown in FIG. 14A), 15A-D, and 16A-C, the piston section 740 of the main body 510, a valve plate 1305, a balance piston 1310, an upstream reservoir 1315, and a downstream reservoir 1320 provide a mechanism to set the compressive force required to activate the bypass valve 100.

In one or more embodiments, the valve plate 1305 includes two pressure relief valves 1405, each having a pressure relief valve inlet 1505 on an upstream side 1510 of the valve plate 1305 and a pressure relief valve outlet 1515 on a downstream side 1520 of the valve plate. In one or more embodiments, the pressure relief valve is actuatable to pass fluid from the pressure relief valve inlets 1505 to the pressure relief valve outlets 1515 when pressure on the upstream side 1510 of the valve plate 1305 exceeds the pressure on the downstream side 1520 of the valve plate 1305 by a crack pressure.

In one or more embodiments, as force is applied to the bypass valve 100 in the weight down direction 205, pressure will build above the valve plate 1305 in the upstream reservoir 1315. In one or more embodiments, when the pressure above the valve plate 1305 in the upstream reservoir 1315 reaches the crack pressure, relief valves 1405 (see FIG. 14B) will open, allowing fluid to flow into the downstream reservoir 1320 below the valve plate 1305. In one or more embodiments, the balance piston 1310 moves downward to balance the pressure in the downstream reservoir 1320 and the pressure in the annulus 115. In one or more embodiments, the "crack pressure" determines the compressive force (i.e., the force required in the weight down direction 205) to activate the bypass valve 100.

In one or more embodiments, check valves 1410 allow fluid to flow through the valve plate 1305 from the downstream reservoir 1320 into the upstream reservoir 1315.

In one or more embodiments, the check valves 1410 include check valve inlets 1525 on the downstream side 1520 of the valve plate 1305. In one or more embodiments, the check valve 1410 includes check valve outlets 1530 on the upstream side 1510 of the valve plate 1305. In one or more embodiments, the check valves 1410 are actuatable to pass fluid from the check valve inlets 1525 to the check valve outlets 1530 when pressure on the downstream side 1520 of the valve plate 1305 exceeds the pressure on the upstream side 1510 of the valve plate 1305.

Ball Bearing Groove

In one or more embodiments, a first cylinder, such as the upper chamber barrel 1015 of the pin end mandrel 525 (see FIGS. 10A-C), includes a longitudinal axis 1055 (see FIG. 10C) along a longitudinal dimension of the first cylinder. In one or more embodiments, the first cylinder includes a ball bearing ring, such as ball bearing ring 1050.

In one or more embodiments, a second cylinder, such as O-ring sleeve 520, is slidably mounted with respect to the first cylinder. That is, in one or more embodiments, the O-ring sleeve 520 slides with respect to the pin end mandrel 525 when the bypass valve 100 is assembled. In one or more embodiments, the second cylinder includes a longitudinally-elongated groove, such as ball bearing groove 975, having a length in the direction of the longitudinal axis 1055, wherein the longitudinally-elongated groove engages with the ball bearing ring 1050 allowing the first cylinder to translate in the longitudinal direction with respect to the second cylinder by a length equal to the length of the longitudinally-elongated groove.

In one or more embodiments, the ball bearing ring 1050 includes a number of ball bearings arranged in a groove around the pin end mandrel housing 1005. In one or more embodiments, the ball bearings have diameters. In one or more embodiments, the diameters of the ball bearings is much less than the length of the longitudinally-elongated groove. In one or more embodiments, the length of the longitudinally-elongated groove is at least two times the diameter of the ball bearings. In one or more embodiments, the length of the longitudinally-elongated groove is at least four times the diameter of the ball bearings. In one or more embodiments, the length of the longitudinally-elongated groove is at least eight times the diameter of the ball bearings.

Ability to Reverse Flow

In one or more embodiments, the bypass valve 100 provides for the flow of fluid from the bore of the bypass valve 100 to the annulus 115 or in the opposite direction. Flow from the bore to the annulus 115 is useful when it is desired to increase the flow of fluids at a particular depth in the borehole 105, for example, to clean out debris that has collected. Flow from the annulus 115 to the bore is useful to remove unwanted fluids in the bore without contaminating the borehole 105.

In one aspect, an apparatus includes a main body housing. The main body housing includes a main body housing inside surface, a main body housing outside surface, and a main body port from the main body housing inside surface to the main body housing outside surface. A spool is contained in the main body housing. The spool is rotatable and translatable with respect to the main body housing among a plurality of open spool positions interleaved with a plurality of closed spool positions. An O-ring sleeve is contained in the housing. The O-ring sleeve includes an O-ring sleeve inside surface, an O-ring sleeve outside surface, an O-ring sleeve port from the O-ring inside surface to the O-ring outside surface, and O-rings mounted on the O-ring sleeve outside surface on either side of the O-ring sleeve port. The O-ring sleeve is engaged with the indexing spool, is not rotatable with respect to the main body housing, and is translatable with respect to the main body housing between an open O-ring sleeve position, in which the spool is in one of the plurality of open spool positions, and a closed O-ring sleeve position, in which the spool is in one of the plurality of closed spool positions. The O-ring sleeve port aligns with the main body port when the O-ring sleeve is in the open O-ring sleeve position and the O-ring sleeve port is sealed from the main body port by the O-rings when the O-ring sleeve is in the closed O-ring sleeve position.

Implementations may include one or more of the following. The spool may include an indexing barrel including a spool indexing slot. The indexing slot may include a plurality of open notches extending in an notch direction, a plurality of closed notches interleaved with the plurality of open notches, wherein the closed notches extend in the notch direction, and transition slots between the open notches and the closed notches, wherein the transition slots extend in a transition-slot direction substantially opposite the notch direction. The open notches may be longer than the closed notches. The spool may include a spring flange coupled to the indexing barrel and a spring barrel coupled to the spring flange. The apparatus may include an oblong O-ring sleeve indexing pin slot in the O-ring sleeve. The apparatus may include an indexing pin extending through the main body housing, through the spool indexing slot, and into the O-ring sleeve indexing pin slot. The oblong O-ring sleeve indexing pin slot may include a width substantially equal to a width of the indexing pin where it extends through the O-ring sleeve indexing pin slot and a length at least twice its width. The length may be substantially aligned with the direction which the O-ring sleeve can translate with respect to the main body. The apparatus may include a spring contained in the housing. The spring may have a shape of a coil. The spring may enclose the spring barrel. The spring may be engaged with the spring flange. The apparatus may include an upstream reservoir bounded on one side by the main body housing, a downstream reservoir, and a valve plate separating the upstream reservoir from the downstream reservoir. The valve plate may include a pressure relief valve. The pressure relief valve may include a pressure relief valve inlet on an upstream side of the valve plate and a pressure relief valve outlet on a downstream side of the valve plate. The pressure relief valve may be actuatable to pass fluid from the pressure relief valve inlet to the pressure relief valve outlet when a pressure on the upstream side of the valve plate exceeds a pressure on the downstream side of the valve plate by a crack pressure. The valve plate may further include a check valve including a check valve inlet on the downstream side of the valve plate and a check valve outlet on the upstream side of the valve plate. The check valve may be actuatable to pass fluid from the check valve inlet to the check valve outlet when pressure on the downstream side of the valve plate exceeds the pressure on the upstream side of the valve plate. The apparatus may further include a balance valve on a side of the downstream reservoir opposite the valve plate. The upstream side of the valve plate may face the upstream reservoir and the downstream side of the valve plate may face the downstream reservoir. The apparatus may further include a second main body port from the main body housing inside surface to the main body housing outside surface and a second O-ring sleeve port from the O-ring inside surface to the O-ring outside surface. The second O-ring sleeve port may align with the second main body port when the O-ring sleeve is in the open O-ring sleeve position and the second O-ring sleeve port may be sealed from the second main housing port by a second set of O-rings when the O-ring sleeve is in the closed O-ring sleeve position.

In one aspect, an apparatus includes a first cylinder. The first cylinder includes a longitudinal axis along a longitudinal dimension of the first cylinder, and a ball bearing ring. The apparatus includes a second cylinder slidably mounted with respect to the first cylinder. The second cylinder includes a groove around a circumference of the second cylinder. The groove has a length in the longitudinal dimension. The groove is engaged with the ball bearing race such that the first cylinder is rotatable with respect to the second cylinder and the first cylinder is translatable in the longitudinal direction with respect to the second cylinder by a distance equal to the length of the groove.

Implementations may include one or more of the following. The ball bearing ring may include a plurality of ball bearings, each ball bearing having a diameter. The length of the groove may be more than twice the diameter of one of the plurality of ball bearings.

In one aspect, an apparatus includes a valve plate. The valve plate includes a pressure relief valve. The pressure relief valve includes a pressure relief valve inlet on an upstream side of the valve plate and a pressure relief valve outlet on a downstream side of the valve plate. The pressure relief valve is actuatable to pass fluid from the pressure relief valve inlet to the pressure relief valve outlet when pressure on the upstream side of the valve plate exceeds the pressure on the downstream side of the plate by a crack pressure. The valve plate includes a check valve. The check valve includes a check valve inlet on the downstream side of the valve plate and a check valve outlet on the upstream side of the valve plate. The check valve is actuatable to pass fluid from the check valve inlet to the check valve outlet when pressure on the second side of the valve plate exceeds the pressure on the first side of the valve plate.

Implementations may include one or more of the following. The apparatus may further include a piston, an upstream reservoir between the piston and the upstream side of the valve plate, a balance piston; and a downstream reservoir between the downstream side of the valve plate and the balance piston. A main body may be coupled to the piston. A box end assembly may be coupled to the main body. The box end assembly may include a threaded box end.

In one aspect, a method includes applying force in a weight down direction to a main body to cause a spool to rotate and translate to a first intermediate position and an O-ring sleeve to translate to a first intermediate position in which a main body port through the main body is sealed from an O-ring sleeve port through the O-ring sleeve by O-rings on either side of the O-ring sleeve port. The method further includes subsequently applying force in a lifted off direction to the main body to cause the spool to rotate and translate to an open position, the O-ring sleeve to translate to an open position in which the main body port is aligned with and communicates with the O-ring sleeve port.

Implementations may include one or more of the following. Force may be applied in the weight down direction to the main body to cause the spool to rotate and translate to a second intermediate position, and an O-ring sleeve to translate to a second intermediate position in which the main body port is sealed from the O-ring sleeve port by the O-rings. Force may subsequently be applied in the lifted off direction to the main body to cause the spool to rotate and translate to a closed position, the O-ring sleeve to translate to a closed position in which the main body port is not aligned with the O-ring sleeve port.

In one aspect, a method includes applying force to a piston in a compression activated bypass valve to increase pressure in an upstream reservoir to a crack pressure, to cause a pressure relief valve in the compression activated bypass valve to open from the upstream reservoir into a downstream reservoir and fluid in the upstream reservoir to flow into the downstream reservoir. The method further includes applying force to the piston to reduce pressure in the upstream reservoir to below the pressure in the downstream reservoir, to cause a check valve in the compression activated bypass valve to open from the downstream reservoir into the upstream reservoir and fluid in the downstream reservoir to flow into the upstream reservoir.

Implementations may include one or more of the following. Applying force to the piston to increase pressure in an upstream reservoir to a crack pressure to may cause a balance piston to move to increase the size of the downstream reservoir. Applying force to the piston to reduce pressure in the upstream reservoir to below the pressure in the downstream reservoir may cause the balance piston to move to decrease the size of the downstream reservoir.

In one aspect, a method includes constructing a drill string and coupling a bypass valve to the drill string. The bypass valve includes a main body housing including a main body housing inside surface, a main body housing outside surface, and a main body port from the main body housing inside surface to the main body housing outside surface. The bypass valve further includes a spool contained in the main body housing. The spool is rotatable and translatable with respect to the main body housing among a plurality of open spool positions interleaved with a plurality of closed spool positions. The bypass valve further includes an O-ring sleeve contained in the housing. The O-ring sleeve includes an O-ring sleeve inside surface, an O-ring sleeve outside surface, an O-ring sleeve port from the O-ring inside surface to the O-ring outside surface, and O-rings mounted on the O-ring sleeve outside surface on either side of the O-ring sleeve port. The O-ring sleeve is engaged with the indexing spool, is not rotatable with respect to the main body housing, and is translatable with respect to the main body housing between an open O-ring sleeve position, in which the spool is in one of the plurality of open spool positions, and a closed O-ring sleeve position, in which the spool is in one of the plurality of closed spool positions. The O-ring sleeve port aligns with the main body port when the O-ring sleeve is in the open O-ring sleeve position and the O-ring sleeve port is sealed from the main body port by the O-rings when the O-ring sleeve is in the closed O-ring sleeve position. The method further includes applying force in a weight down direction to the drill string to cause the spool to rotate and translate to a first intermediate position, and the O-ring sleeve to translate to a first intermediate position in which a main body port is sealed from the O-ring sleeve port through the O-ring sleeve by the O-rings. The method further includes subsequently applying force in a lifted off direction to the drill string to cause the spool to rotate and translate to an open position, the O-ring sleeve to translate to an open position in which the main body port is aligned with and communicates with the O-ring sleeve port.

Implementations may include one or more of the following. Applying force in the weight down direction to the drill string may cause the spool to rotate and translate to a second intermediate position, and an O-ring sleeve to translate to a second intermediate position in which the main body port is sealed from the O-ring sleeve port by the O-rings. Subsequently applying force in the lifted off direction to the drill string may cause the spool to rotate and translate to a closed position, the O-ring sleeve to translate to a closed position in which the main body port is not aligned with the O-ring sleeve port.

The word "coupled" herein means a direct connection or an indirect connection.

The text above describes one or more specific embodiments of a broader invention. The invention also is carried out in a variety of alternate embodiments and thus is not limited to those described here. The foregoing description of an embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. An apparatus comprising:
   a main body housing comprising:
      a main body housing inside surface,
      a main body housing outside surface, and
      a main body port from the main body housing inside surface to the main body housing outside surface;
   a spool contained in the main body housing, wherein the spool is rotatable and translatable with respect to the main body housing among a plurality of open spool positions interleaved with a plurality of closed spool positions; and
   an O-ring sleeve contained in the housing, the O-ring sleeve comprising:
      an O-ring sleeve inside surface,
      an O-ring sleeve outside surface,
      an O-ring sleeve port from the O-ring inside surface to the O-ring outside surface, and
      O-rings mounted on the O-ring sleeve outside surface on either side of the O-ring sleeve port;
      wherein the O-ring sleeve is engaged with the spool, is not rotatable with respect to the main body housing, and is translatable with respect to the main body housing between an open O-ring sleeve position, in which the spool is in one of the plurality of open spool positions, and a closed O-ring sleeve position, in which the spool is in one of the plurality of closed spool positions,
      wherein the O-ring sleeve port aligns with the main body port when the O-ring sleeve is in the open O-ring sleeve position and the O-ring sleeve port is sealed from the main body port by the O-rings when the O-ring sleeve is in the closed O-ring sleeve position.

2. The apparatus of claim 1 wherein the spool comprises:
   an indexing barrel comprising a spool indexing slot, wherein the indexing slot comprises:
      a plurality of open notches extending in a notch direction,
      a plurality of closed notches interleaved with the plurality of open notches, wherein the closed notches extend in the notch direction, and
      transition slots between the open notches and the closed notches, wherein the transition slots extend in a transition-slot direction substantially opposite the notch direction;
      wherein the open notches are longer than the closed notches; and
   a spring flange coupled to the indexing barrel; and
   a spring barrel coupled to the spring flange.

3. The apparatus of claim 2 further comprising:
   an oblong O-ring sleeve indexing pin slot in the O-ring sleeve;
   an indexing pin extending through the main body housing, through the spool indexing slot, and into the O-ring sleeve indexing pin slot.

4. The apparatus of claim 3 wherein the oblong O-ring sleeve indexing pin slot comprises:
   a width substantially equal to a width of the indexing pin where it extends through the O-ring sleeve indexing pin slot; and
   a length at least twice its width.

5. The apparatus of claim 4 wherein the length is substantially aligned with the direction which the O-ring sleeve can translate with respect to the main body.

6. The apparatus of claim 2 further comprising:
a spring contained in the housing, wherein:
  the spring has a shape of a coil;
  the spring encloses the spring barrel; and
  the spring is engaged with the spring flange.

7. The apparatus of claim 1 further comprising:
an upstream reservoir bounded on one side by the main body housing;
a downstream reservoir; and
a valve plate separating the upstream reservoir from the downstream reservoir, the valve plate comprising:
  a pressure relief valve comprising:
    a pressure relief valve inlet on an upstream side of the valve plate,
    a pressure relief valve outlet on a downstream side of the valve plate, and
    wherein the pressure relief valve is actuatable to pass fluid from the pressure relief valve inlet to the pressure relief valve outlet when a pressure on the upstream side of the valve plate exceeds a pressure on the downstream side of the valve plate by a crack pressure; and
  a check valve comprising:
    a check valve inlet on the downstream side of the valve plate,
    a check valve outlet on the upstream side of the valve plate, and
    wherein the check valve is actuatable to pass fluid from the check valve inlet to the check valve outlet when pressure on the downstream side of the valve plate exceeds the pressure on the upstream side of the valve plate.

8. The apparatus of claim 7 further comprising a balance piston on a side of the downstream reservoir opposite the valve plate.

9. The apparatus of claim 7 wherein the upstream side of the valve plate faces the upstream reservoir and the downstream side of the valve plate faces the downstream reservoir.

10. The apparatus of claim 1 further comprising:
a second main body port from the main body housing inside surface to the main body housing outside surface; and
a second O-ring sleeve port from the O-ring inside surface to the O-ring outside surface;
wherein the second O-ring sleeve port aligns with the second main body port when the O-ring sleeve is in the open O-ring sleeve position and the second O-ring sleeve port is sealed from the second main housing port by a second set of O-rings when the O-ring sleeve is in the closed O-ring sleeve position.

11. A method comprising:
constructing a drill string;
coupling a bypass valve to the drill string, the bypass valve comprising:
  a main body housing comprising:
    a main body housing inside surface,
    a main body housing outside surface, and
    a main body port from the main body housing inside surface to the main body housing outside surface;
  a spool contained in the main body housing, wherein the spool is rotatable and translatable with respect to the main body housing among a plurality of open spool positions interleaved with a plurality of closed spool positions; and
  an O-ring sleeve contained in the housing, the O-ring sleeve comprising:
    an O-ring sleeve inside surface,
    an O-ring sleeve outside surface,
    an O-ring sleeve port from the O-ring inside surface to the O-ring outside surface, and
    O-rings mounted on the O-ring sleeve outside surface on either side of the O-ring sleeve port;
    wherein the O-ring sleeve is engaged with the spool, is not rotatable with respect to the main body housing, and is translatable with respect to the main body housing between an open O-ring sleeve position, in which the spool is in one of the plurality of open spool positions, and a closed O-ring sleeve position, in which the spool is in one of the plurality of closed spool positions,
  wherein the O-ring sleeve port aligns with the main body port when the O-ring sleeve is in the open O-ring sleeve position and the O-ring sleeve port is sealed from the main body port by the O-rings when the O-ring sleeve is in the closed O-ring sleeve position;
applying force in a weight down direction to the drill string to cause:
  the spool to rotate and translate to a first intermediate position, and
  the O-ring sleeve to translate to a first intermediate position in which a main body port is sealed from the O-ring sleeve port through the O-ring sleeve by the O-rings;
subsequently applying force in a lifted off direction to the drill string to cause:
  the spool to rotate and translate to an open position, and
  the O-ring sleeve to translate to an open position in which the main body port is aligned with and communicates with the O-ring sleeve port.

12. The method of claim 11 further comprising:
applying force in the weight down direction to the drill string to cause:
  the spool to rotate and translate to a second intermediate position, and
  an O-ring sleeve to translate to a second intermediate position in which the main body port is sealed from the O-ring sleeve port by the O-rings;
subsequently applying force in the lifted off direction to the drill string to cause:
  the spool to rotate and translate to a closed position,
  the O-ring sleeve to translate to a closed position in which the main body port is not aligned with the O-ring sleeve port.

* * * * *